United States Patent [19]
Kawaguchi et al.

[11] Patent Number: 5,729,530
[45] Date of Patent: Mar. 17, 1998

[54] ATM SWITCH

[75] Inventors: Kenji Kawaguchi, Chigasaki; Kenji Kawakita, Urawa; Hiroshi Izuha, Yokohama, all of Japan

[73] Assignee: Hitachi, Ltd., Tokyo, Japan

[21] Appl. No.: 568,363

[22] Filed: Dec. 6, 1995

[30] Foreign Application Priority Data

Dec. 7, 1994 [JP] Japan .................................. 6-303343

[51] Int. Cl.[6] .................................................. H04L 12/56
[52] U.S. Cl. .................................................. 370/236; 370/395
[58] Field of Search .................................. 370/235, 236, 370/395, 396, 397, 398, 399, 474, 905, 229

[56] References Cited

U.S. PATENT DOCUMENTS

| | | | |
|---|---|---|---|
| 5,426,640 | 6/1995 | Hluchyj | 370/94.1 |
| 5,528,763 | 6/1996 | Serpanos | 395/250 |
| 5,557,610 | 9/1996 | Calamvokis et al. | 370/54 |

OTHER PUBLICATIONS

Armitage et al., "Packet Reassembly During Cell Loss," IEEE Network, pp. 26–34, Sep. 1993.

Kamal, "A Performance Study of Selective Cell Discarding Using the End-of-packe Indicator in AAL Type 5," INFOCOM 95, vol. 3, pp. 1264–1272, 1995.

Kawahara et al., "Performance Evaluation of Selective Call Discard Schemes in ATM Networks," INFOCOM 96, vol. 3, pp. 1054–1060, 1996.

Inai, "Block of Cells Discarding for Congestion Control in ATM Networks," Singapore ICCS 94, pp. 540–544, 1994.

*Primary Examiner*—Benedict V. Safourek
*Assistant Examiner*—Matthew C. Phillips
*Attorney, Agent, or Firm*—Antonelli, Terry, Stout, & Kraus, LLP

[57] ABSTRACT

An ATM switch capable of preventing the network resource from being wasted during the occurrence of an overcrowding condition. In the ATM switch, both a message type and a processing mode are stored in correspondence to the connections. When the discarding of a cell occurs, the connection to which the discarded cell belongs is set to a discard mode by a cell discard controlling circuit, and each cell constituting the same message as that of the discarded cell out of the subsequent cells is discarded, and when a demarkation of the message has been detected, the processing mode is returned to a transfer mode, whereby the subsequent received cells are transferred in a normal manner. Thus, the cell which has become useless for a reception terminal is discarded in the network.

6 Claims, 7 Drawing Sheets

| PROCESSING MODE | SELECTOR OUTPUT |
|---|---|
| TRANSFER | CELL |
| REPLACEMENT | END CELL |
| DISCARD | EMPTY CELL |

FIG.5

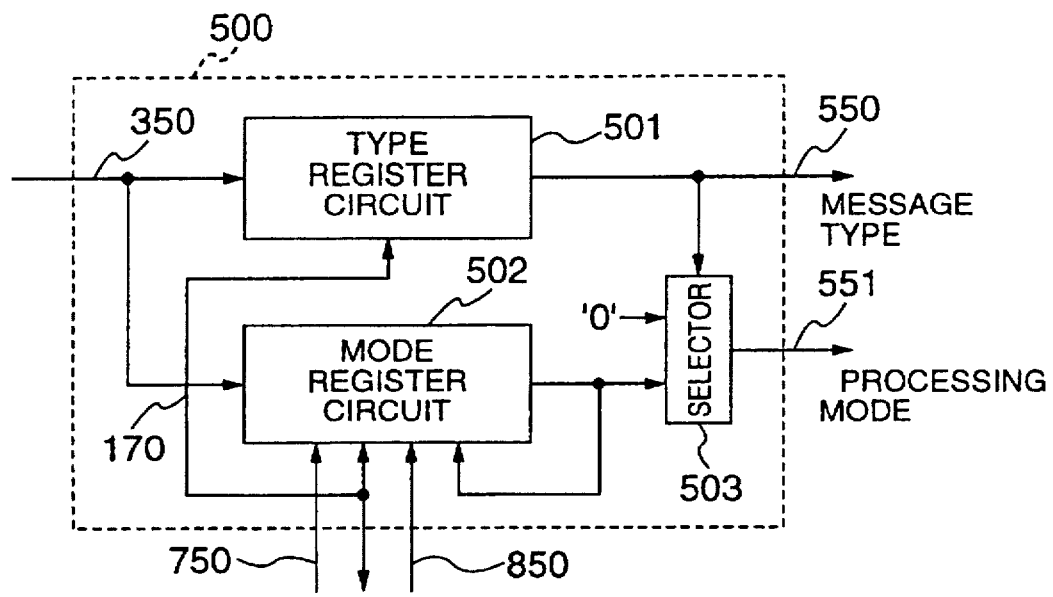

FIG.6

| CURRENT MODE | DEMARKATION DETECTION SIGNAL | DISCARD DETECTION SIGNAL | MODE AFTER CHANGE |
|---|---|---|---|
| TRANSFER | NON-DETECTION | NON-DETECTION | TRANSFER |
|  | NON-DETECTION | DETECTION | REPLACEMENT |
|  | DETECTION | NON-DETECTION | TRANSFER |
|  | DETECTION | DETECTION | REPLACEMENT |
| REPLACEMENT | NON-DETECTION | NON-DETECTION | DISCARD |
|  | NON-DETECTION | DETECTION | REPLACEMENT |
|  | DETECTION | NON-DETECTION | TRANSFER |
|  | DETECTION | DETECTION | REPLACEMENT |
| DISCARD | NON-DETECTION | NON-DETECTION | DISCARD |
|  | DETECTION | NON-DETECTION | TRANSFER |

ATM SWITCH

BACKGROUND OF THE INVENTION

The present invention relates in general to an ATM (Asynchronous Transfer Mode) cell switch for use in a packet communication network of an ATM system, and more particularly to an ATM cell switch having a facility of controlling the discarding of an ATM cell which has become unnecessary.

In a packet communication network, the information which is transmitted from each terminal to a network is assembled into a message having a specific format in accordance with a protocol for the transfer control. In general, each message has a variable length which is changed in accordance with the data to be transmitted. As a result, if each message is directly sent to the network, the interposition of a software is required for performing the exchanging processing. Such an operation makes it less possible to achieve; high communication speed.

In view of such, the network of an ATM system has been developed which is designed in such a way that a message having a variable length is divided into a plurality of packets called cells each having a fixed length. Thus, all data to be processed in the network is in the form of a fixed length packet thereby allowing the packet switching operation to be carried out by using only hardware at high speed. According such an ATM system, no information on superior message structure is required, in the cell processing in the network, and processings such as transferring of the cells can be carried out by using only a header portion of each cell.

In addition, in the ATM system, the maximum band, which is required by each terminal equipment, out of the communication bands included in the network side is not always occupied, and hence only when the transmission data is present, is the band used. As a result, it is possible to expect the multiplexing gain called the statistical multiplexing effect. Therefore, it is possible to arbitrarily set the discarding rate of the cells in the network depending on the system for controlling the reception of the call.

There may occur the case where a plurality of burst data cells among the cells which have been inputted to the ATM exchange concentrate on the specific output line, and as a result, the band capacity of that specific output line is exceeded to provide the overcrowding state. In such a case, the discarding processing is necessary for the excess cell in which the capacity of the buffer is exceeded. In this connection, with respect to the processing of discarding the cell in the overcrowding state, for example, a method of selectively discarding the cell in accordance with the discarding priority assigned to every cell is described in an article entitled "Guide of B-ISDN", Ohm Company, 1992, pp.131 to 132. Incidentally, in the case where the discarding control based on the priority is not employed, newly arrived cells which can not be stored due to the insufficiency of the capacity of the buffers are discarded one after another. In any case, in the conventional system, the relationship between the discarded cells and the connection to which each cell belongs, or the message unit of the host protocol is not considered at all.

However, for each terminal equipment which is connected to the ATM network, even when only one cell consitituting the received message is subjected to the discarding processing in the middle of the transmission, it is impossible to reconstitute the normal message. If the processing of discarding the cell is executed, the cell before the discarded cell constituting the same message, or the cell after the discarded cell will become a useless cell even if that cell is normally received by the associated terminal equipment.

In the conventional ATM network, the processing for other cells in the same message which have become insignificant or useless for the reception side terminal equipment due to the above-mentioned discarding of a cell is not considered at all. As a result, the above-mentioned insignificant cell wastes the band in the output line in the overcrowding state, and also buffer area of the exchange is used by the insignificant cell which has arrived at the exchange after discarding of the related cell such that the exchange resource or the band of the transmission line is prevented from being used by other valid cells. This may result in the new discarding of the cell in some cases.

SUMMARY OF THE INVENTION

It is therefore an object of the present invention to provide an ATM switch and a method of controlling the discarding of a cell which are capable of positively discarding a cell, which has become insignificant for the reception side terminal equipment, in the network such that other valid cells can be prevented from being discarded as much as possible.

In order to attain the above-mentioned object, according to one aspect of the present invention, in the case where the discarding of a cell is generated on a certain connection, the cell belonging to the connection of interest is a subject of the discarding with a superior protocol message unit until a valid cell belonging to the next message has arrived.

In order to realize such discarding of a cell, in an ATM switch according to the present invention, for example, processing modes for the cells are stored in correspondence to respective connections, and at every arrival of a new cell, the processing mode corresponding to the new cell is referred to, thereby carrying out judgement with respect to the transfer/discard of the cell incidentally, the processing modes of the connections are, for example, such that the modes of all the connections are initially set to "a transfer mode". Then, when a buffer controlling circuit for controlling the operation of writing the cell to the buffer memory carries out the discarding of the cell, the mode of the connection corresponding to the discarded cell is changed to "a discard mode", and at the time point when the last cell (ending cell) of the message to which the above-mentioned discarded cell belongs has been detected, the mode of the connection of interest may be returned to "the transfer mode" again.

The detection of the above-mentioned ending cell may be changed in accordance with a type of the message which is being used on each connection. For example, both the position of the field which is to be inspected in each cell and the value which are to be detected are changed depending on the type of the message to judge whether or not the cell of interest is an ending cell of the message.

In addition, the control for the discarding of the cell may not be carried out depending on the type of connection in some cases. Therefore, the procedure may be available in which the types of superior protocol message are registrated for every connection, and on arrival of the cell, it is judged whether or not that cell corresponds to the connection on which the control for the discarding should be carried out. As for the types of superior protocol message which are used on the connection, there are, for example, "AAL Type 5", "Type ¾" and the like. Those types are used in the data communication of a connection type/a connectionless type. Note that, in [AAL Type 5], the end display is present in the ATM header, while in [Type ¾], the display thereof is present in the SAR header. Judging to which connection each cell belongs may be carried out by referring to both a virtual path identifier "VPI" and a virtual channel identifier "VCI" which are included in the ATM header of each cell.

According to the present invention, with respect to the connection which encounters the discarding of the cell, the control for the discarding of the cell is carried out in units of a message, whereby it is possible to effectively utilize the band in the output line. This is an advantage. In addition, there is provided another advantage in which the insignificant cell is positively subjected to the discarding processing, whereby the network resource can be assigned to the valid cells on other connections, and the new overcrowding can be prevented from occurring and also the discarding of the cell can be prevented from being dispersed over many messages.

BRIEF DESCRIPTION OF THE DRAWINGS

FIG. 5 is a block diagram showing a configuration of a connection attribute table circuit shown in FIG. 3;

FIG. 6 is a view showing the operation of rewriting the mode of the connection attribute table circuit shown in FIG. 3;

DESCRIPTION OF THE PREFERRED EMBODIMENTS

Preferred embodiments of the present invention will hereinafter be described in detail with reference to the accompanying drawings.

Firstly, a first embodiment (an embodiment 1) of the present invention will hereinbelow be described.

Figure 1:
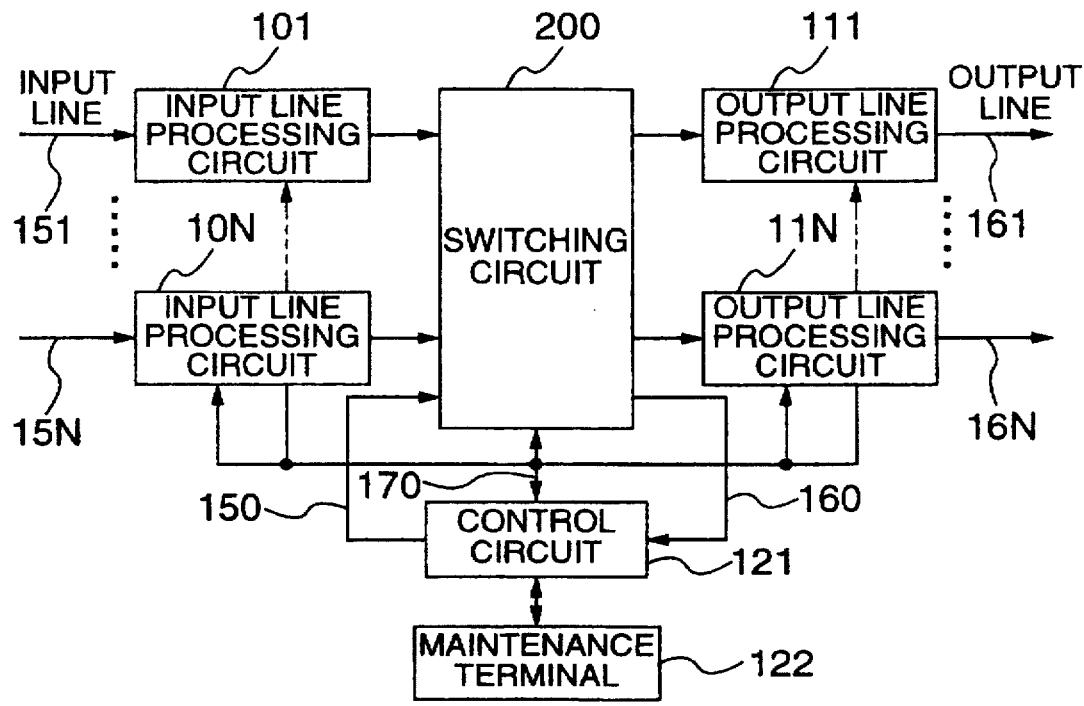
FIG. 1 is a block diagram showing the whole configuration of an embodiment of an ATM switch to which the present invention is applied.

FIG. 1 is a block diagram showing the whole configuration of the first embodiment of an ATM switch to which the present invention is applied. Incidentally, a method of realizing an ATM exchange employing a switch of a common buffer system is described in JP-A-2-1669 entitled "Switching System and Method of Constructing the Same" (corresponding to U.S. Pat. No. 4,910,731 and U.S. Pat. No. Re 34,305 both assigned to the same assignee).

Input lines 151 to 15N and output lines 161 to 16N are connected to respective subscriber terminals or other ATM switches. Each of input line processing circuits 101 to 10N executes the processings such as the photo/electric conversion, the transmission frame termination and the cell synchronization and carries out the adding of the internal information required by both header conversion and a switching circuit for the ATM cells which have been inputted from the input lines 151 to 15N, respectively.

Figure 9:
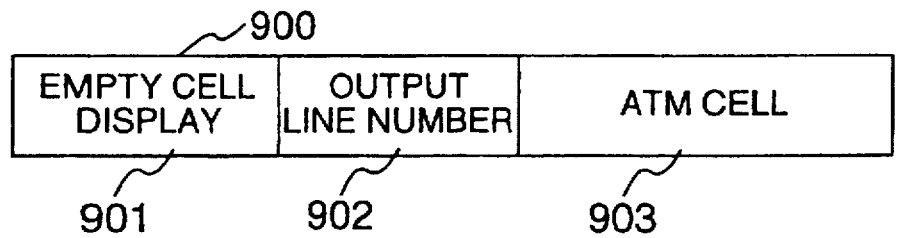
FIG. 9 is a view showing an example of an internal cell format.

The cell to which the internal information has been added has the internal cell format as shown in FIG. 9. Then, after the cell has been inputted to a switching circuit 200, it is outputted to any one of the output lines 160 to 16N which is determined in accordance with routing information (output line number) 902. Incidentally, after the cells which were outputted from the switching circuit 200 have been subjected to the processings such as the cell synchronization, the transmission frame termination and the electric/photo conversion in respective output line processing circuits 111 to 11N, the cells are outputted to the respective output lines 161 to 16N.

The cell which is used to control a call or manage the network is distributed to an output line 160 to be inputted to a control circuit 121. The control circuit 121 carries out the operation of controlling or monitoring the switching circuit 200 and the line processing circuits 101 to 10N and 111 to 11N through a control line 170 and an input line 150 in accordance with the information of the input cell. In addition, the control circuit 121 produces a cell including the control information to be transmitted to another ATM switch and terminal, inputs the cell thus produced to the switching circuit 200 through the input line 150 and transfers that cell to the destination apparatus.

Figure 2:
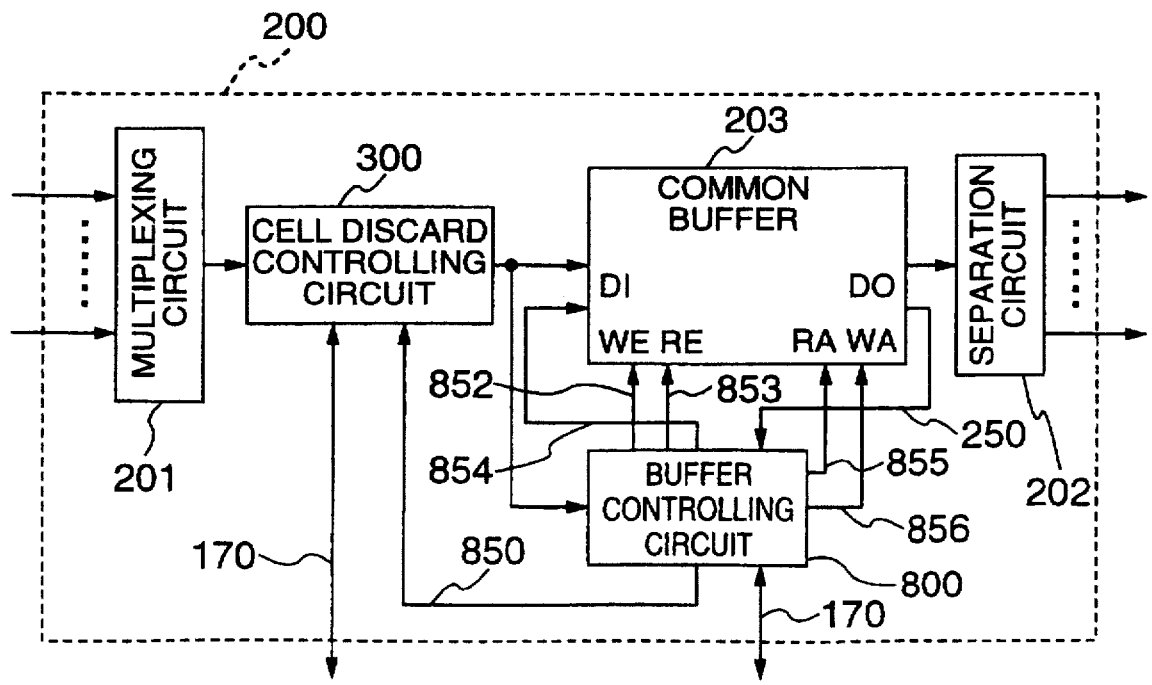
FIG. 2 is a block diagram showing a configuration of a switching circuit of a common buffer system to which the present invention is applied.

FIG. 2 is a block diagram showing a configuration of an embodiment of the ATM switching circuit unit to which the present invention is applied.

The switching circuit 200 is constituted by a multiplexing circuit 201, a circuit 300 for controlling discarding of a cell, a common buffer 203, a circuit 800 for controlling a buffer, and a separation circuit 202. The cells which have been inputted in parallel through the respective input lines are converted into a series cell train in the multiplexing circuit 201 and then are inputted to the cell discard controlling circuit 300.

The cell discard controlling circuit 300 judges whether the inputted cells should be passed or discarded. To the cells which have been passed through the cell discard controlling circuit 300, storage areas are assigned in the common buffer 203 by the buffer controlling circuit 800. In the case where the buffer areas are insufficient and hence the input cells are discarded by the buffer controlling circuit 800, the resultant data is transmitted to the cell discard controlling circuit 300 through a discard detection signal line 850 to update the attribute information of passage/discard. In such a way, at the time when the processing of storing one cell in the buffer memory has been completed, the cell discard controlling circuit 300 begins to execute the processing for the next cell.

The buffer controlling circuit 800 outputs a read address at predetermined timing coinciding with the division cycle of the separation circuit 202 and reads out the cell from the common buffer 203. The cell which has been read out is outputted to any one of the output lines which is specified on the basis of the routing information.

Figures 3, 4:
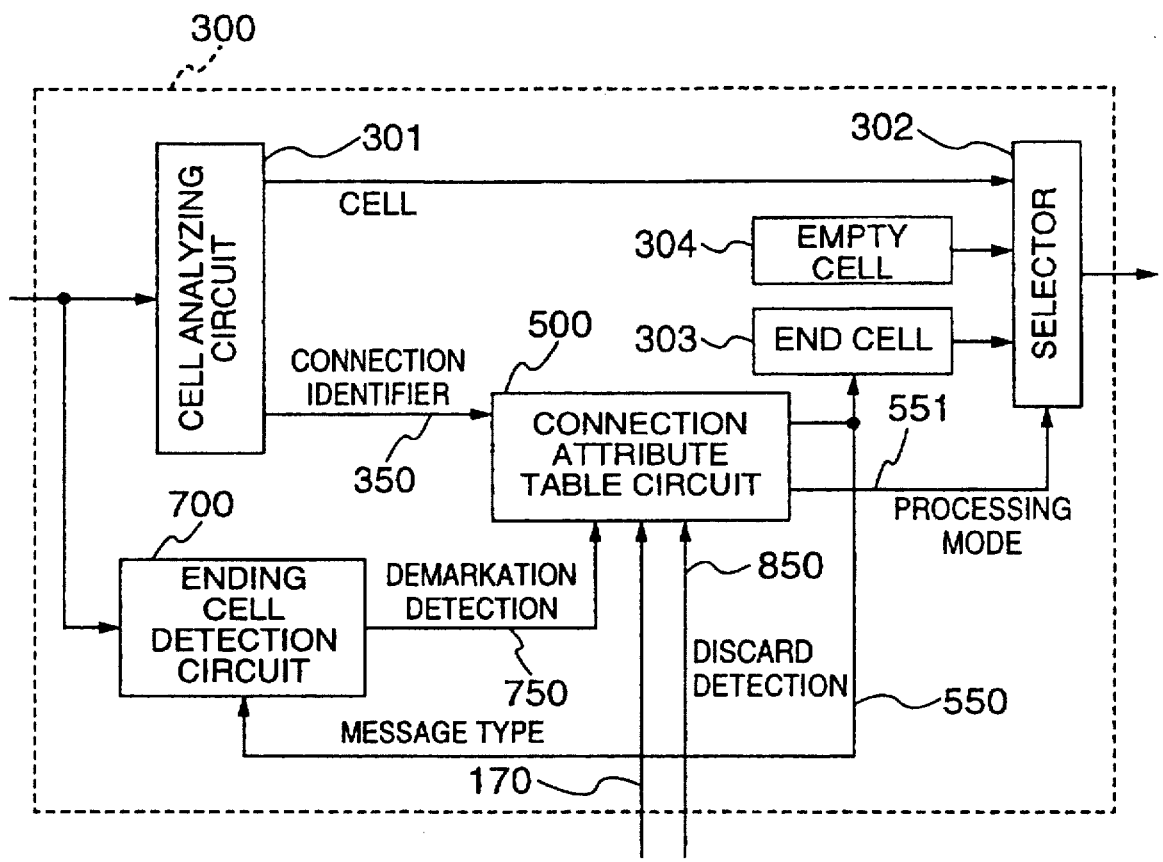
FIG. 3 is a block diagram showing a configuration of a circuit for controlling discarding of a cell shown in FIG. 1.
FIG. 4 is a view showing the relationship between the operation of a selector and the processing mode in FIG. 3.

FIG. 3 is a block diagram showing a configuration of an embodiment of the cell discard controlling circuit 300 included in the ATM switching circuit.

After the cell discard controlling circuit 300 has fetched the series cells outputted from the multi-plexing circuit 201 one by one, the circuit 300 extracts the connection identifier from each cell in a circuit 301 for analyzing a cell, and then supplies the connection identifier thus extracted as an address to a connection attribute table circuit 500.

The connection attribute table circuit 500 outputs both a signal relating to the message type which is used in the connection specified by the above-mentioned connection identifier, and a signal relating to the current processing mode relating to the cell on that connection. Incidentally, as for the above-mentioned connection identifier, both VPI and VCI in the ATM cell may be used. In addition, in the case where the superior protocol is "AAL Type ¾", in addition to the above-mentioned VPI and VCI, MID may also be used.

As for the processing mode, the three kinds of values relating to "transfer", "replacement" and "discard" are prepared. In accordance with any one of the values of the processing mode, as shown in FIG. 4, the selector 302 selects any one of the output cell from the cell analyzing circuit 301, the end cell 303 and the empty cell 304 to output the selected cell.

The connection attribute table circuit 500 as shown in FIG. 5 assigns a predetermined value to the message type for every logical connection. That is, the connection attribute table circuit 500 assigns "0" to the message type which is not a subject of the control of the discarding of the cell, and also sequentially assigns "1", ... in this order to the message types each of which is a subject of the control of the discarding of the cell. Even in the case where the message type which is to be used on a certain connection is a subject of the control of the discarding of the cell, when the control of the discarding of the cell is not carried out exceptionally for that connection, "0" is set to that message type. As a result, with respect to the connection as well which employs the message type which is to be a subject of the control of the discarding of the cell, it is possible to select whether or not the control of the discarding of the cell should be carried out. In addition, a type register circuit 501 outputs the value relating to the message type for selecting the format of the end cell to be outputted, in the case where the selector 302 selects the end cell 303.

The value relating to the processing mode and the value relating to the message type are respectively stored in a mode register circuit 502 and the type register circuit 501 for every connection.

The type register circuit 501 and the mode register circuit 502 select the registers from which the values are to be read out, respectively, in accordance with the value of the connection identifier which has been inputted through the input line 350. In this connection, with respect to the value of the message type, the type register circuit 501 outputs directly the value which has been outputted from the selected register. With respect to the value of the processing mode, in the case where the value of the message type is "0", the control is carried out in such a way that instead of the value stored in the selected register, the selector 503 outputs the value of "0" representing the transfer mode. In the case where the message type corresponds to the value other than "0", the value which has been outputted from the selected register is directly outputted.

In the cell discard controlling circuit 300, the cell which has been fetched from the multiplexing circuit 201 is inputted to a circuit 700 for detecting an ending cell as well as to the cell analyzing circuit 301. The ending cell detecting circuit 700 detects the ending cell as a demarkation of the message out of the input cells and also selects both an inspection field position in the ATM cell and the value thereof.

Figure 7:
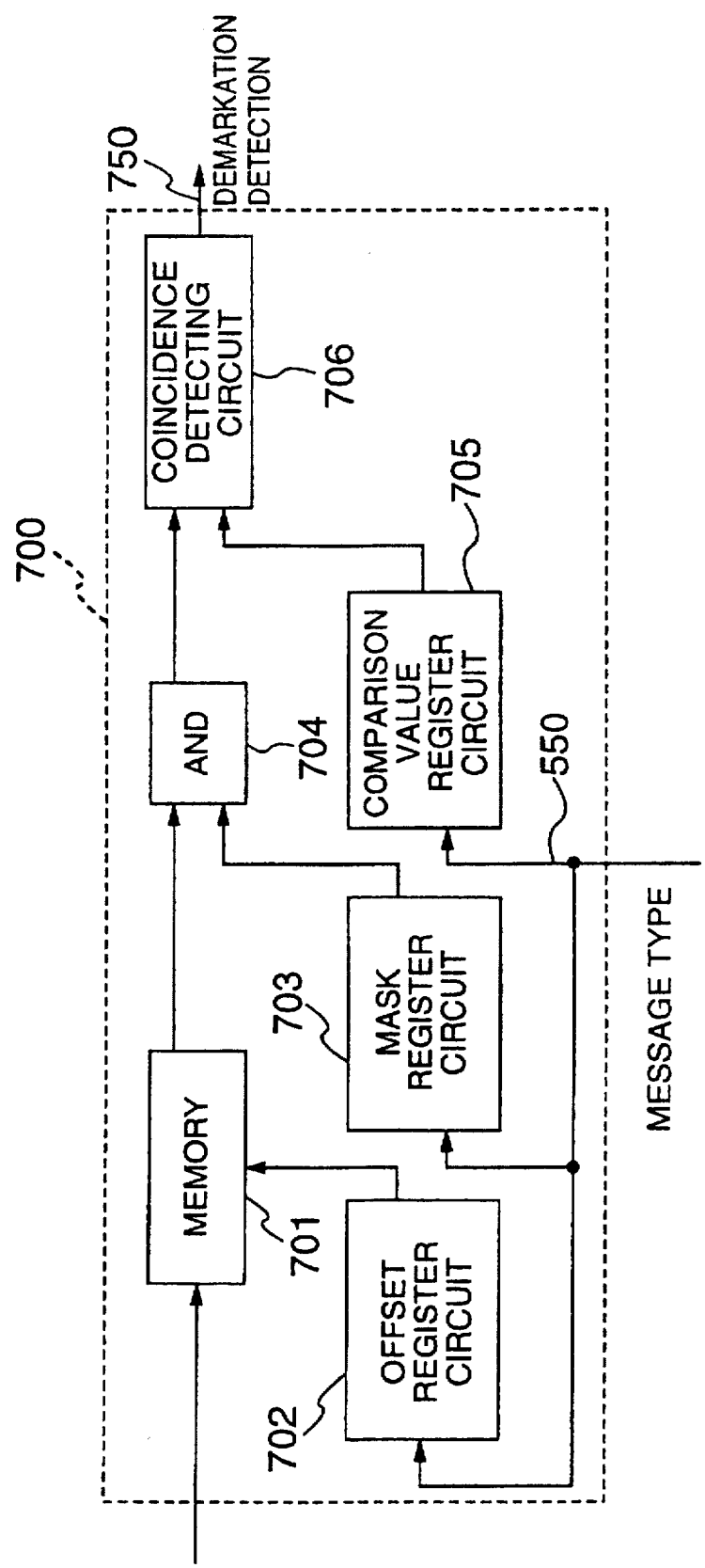
FIG. 7 is a block diagram showing a configuration of an embodiment of a circuit for detecting an ending cell shown in FIG. 3.

FIG. 7 shows a configuration of an embodiment of the ending cell detecting circuit 700.

In the ending cell detecting circuit 700, the input cells are temporarily stored in a memory 701. Thereafter, when the signal relating to the message type value is inputted from the connection attribute table circuit 500, the registers from which the values are to be read out in accordance with the message type value are respectively selected from among an offset register circuit 702, a mask register circuit 703 and a comparison value register circuit 705, and then the values which are set for every type are respectively outputted from those register circuits.

The offset value which is outputted from the offset register circuit 702 specifies a specific field position in the cell which is to be read out from the memory. The data which is read out from the memory is inputted to an AND circuit 704.

With respect to the mask value which is outputted from the mask register circuit 703, the value of "0" is set into a bit position other than the bit position which is a subject of the inspection in the data which is read out. The AND circuit 704 carries out the logical AND between the mask value and the data which is read out from the above-mentioned memory 701 to output the resultant logical value to a coincidence detecting circuit 706.

The comparison value which is outputted from the comparison register circuit 705 is a bit pattern representing the bit position as the ending cell. The coincidence detecting circuit 706 compares the bit pattern and the value outputted from the AND circuit 704 with each other. In the case where both the values coincide with each other, a detection signal representing that the ending cell is detected is outputted.

As for the offset value, the mask value and the comparison value, "3", "10" and "2" may be set, respectively, in the case where the data to be read out is 1 byte and corresponds to "AAL Type 5" for example. In addition, in the case of "AAL Type ¾", "5", "192" and "64" may be set, respectively.

After the connection attribute table circuit 500 has outputted the processing mode value and the message type value which are used to carry out the control of the discarding of the cell, the circuit 500 updates the current processing mode in accordance with both the assignment result outputted from the buffer controlling circuit 800 and the detection result outputted from the ending cell detecting circuit 700. The update of the mode is carried out in accordance with the change logic shown in FIG. 6 for example.

When the update of the mode has been completed, the processing for one input cell in the cell discard controlling circuit is completed, and then for the next cell, the above-mentioned processings are repeatedly executed.

The reason for preparing "replacement" in addition to "transfer" and "discard" as the processing modes is that the reception terminal must be notified of the occurrence of the discarding of the cell, and also it must be reported quickly that the normal assembly of the message becomes impossible. By this notification, the reception terminal equipment does not need to continue to reserve uselessly the needless resource, and also an appropriate operation when the message can not be normally received can be speedily carried out. Incidentally, in order to provide for the case where the cell for reporting the discarding of the cell itself is discarded on the way, the above-mentioned notification cell may be repeatedly produced and sent by plural times.

Next, description will be given with respect to a method of detecting the discarding of the cell.

Figure 8:
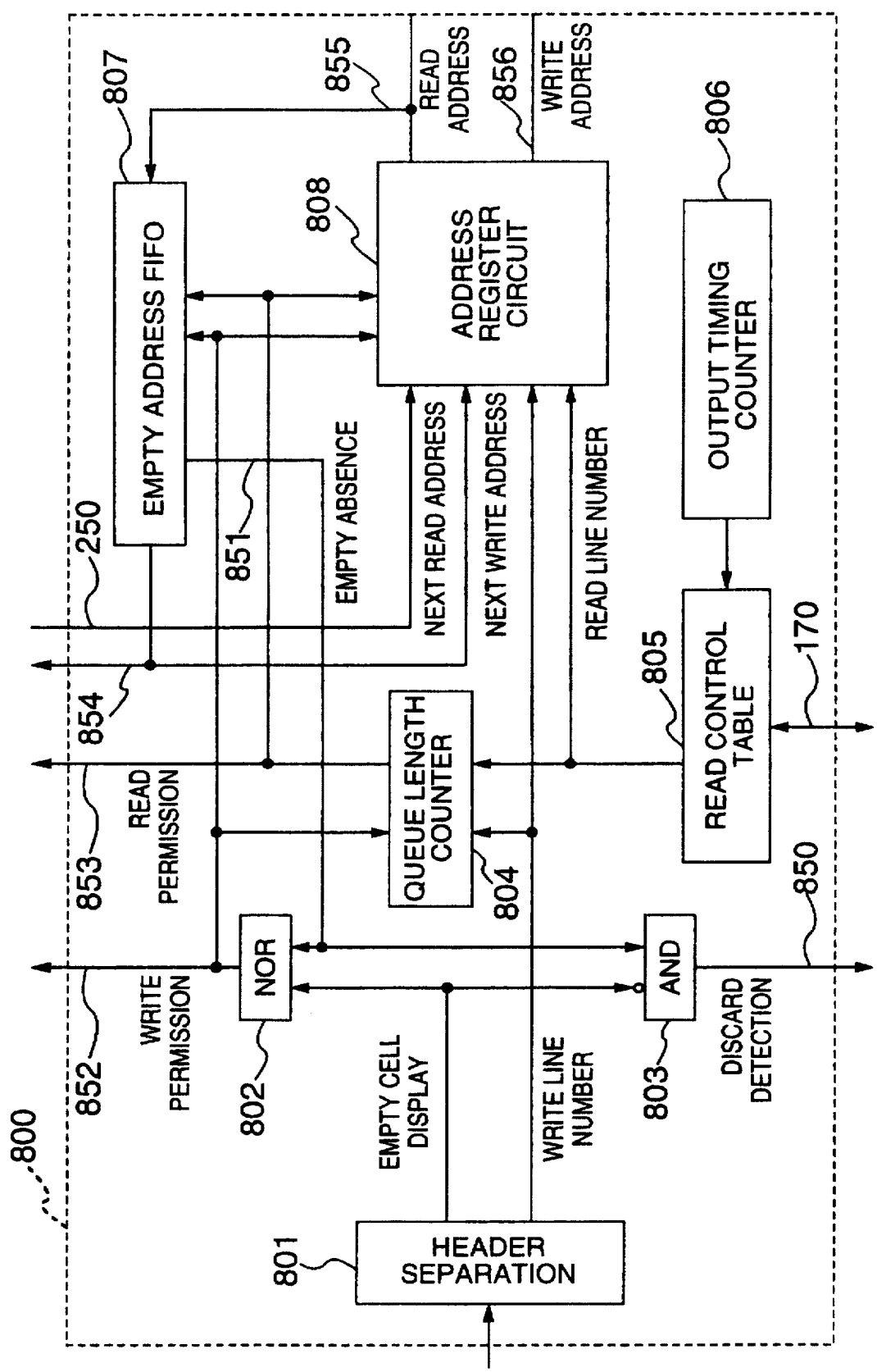
FIG. 8 is a block diagram showing a configuration of a circuit for controlling a buffer shown in FIG. 2.

FIG. 8 shows a configuration of an embodiment of the buffer controlling circuit includes the facility of detecting the discarding of the cell.

In the switching circuit of the common buffer system, without preparing output queues corresponding to the output lines in the fixed position in the buffer, an arbitrary empty address is assigned to the associated queue corresponding to its output line on all such occasions, and a plurality of queues having the logical FIFO form which are list-structured with the pointer address are constructed while sharing the empty area(s) in the buffer memory. When a new cell is inputted, the order relationship among the address (write address) of the cell storage area to be connected to each queue, the storage area (read address) of the cell which is to be fetched from each queue in correspondence to the associated output line, and the cell storage area is managed unifiedly by the buffer controlling circuit 800.

The storage area in the buffer of each cell is determined every time a storage request for the cell is issued, and the arbitrary empty address at the time point when read out from the empty address buffer (FIFO) is assigned. The addresses in the storage areas which have been removed from the queue to be in the empty state are sequentially registrated in the above-mentioned empty address buffer. Therefore, in the switching circuit of this form, the input cell can be coupled to the queue corresponding to the arbitrary output line as long as the empty address is present in the empty address buffer. However, if no empty address is available in the empty address buffer, the input cell can not be written to the buffer, and hence the input cell has no choice but to be discarded. Whether or not the discarding of the cell occurs can be detected by judging whether or not any empty address remains in the empty address buffer. Incidentally, in the case where a limit is previously provided for the length of each queue, whether or not a new input cell is discarded can be detected on the basis of each value in a queue length counter.

The cell which has been outputted from the cell discard controlling circuit 300 is, as shown in FIG. 2, inputted to both the common buffer 203 and the buffer controlling circuit 800. As shown in FIG. 9, each cell which is inputted to the buffer controlling circuit 800 has both an empty cell display portion 901 and an output line number portion 902 as the internal information which have been added through each of the input line processing circuits 101 to 10N. Incidentally, in this example, both VPI and VCI of each cell are written into a part of the output line number portion 902 for the sake of simplicity. But, both VCP and VCI of each cell may be arranged as a field different from the output line number in the front portion of the empty cell display portion 901. To the empty cell display portion 901, the value of "1" is set when the cell is the empty cell and the value of "0" is set in other cases.

A header separation circuit 801 extracts the header portion of the input cell and outputs both a display signal representing whether or not the input cell is the empty cell and a signal representing the write line number in accordance with the contents of the fields 901 and 902. In the case where the input cell is the empty cell, since a signal representing the write permission is not outputted from a NOR circuit 802, the assignment of the buffer area is not carried out and hence the cell is not written to the common buffer 203. In addition, in this case, the discard detection signal is not outputted from an AND circuit 803 irrespective of existence and non-existence of the empty address.

On the other hand, in the case where the input cell is a cell other than the empty cell, the signal relating to the output line number is inputted as the write line number for selecting the queue to both a queue length counter 804 and an address register circuit 808. The address register circuit 808 outputs both the address, which has been fetched from an empty address FIFO 807 during the initialization or the last cell writing operation, as a write address for the common buffer 203, and the empty address, which has been obtained from the empty address FIFO 808 this time, as a next write address. As a result, the input cell and the next write address are written in a pair to the above-mentioned write address position of the common buffer 203 (refer to FIG. 2). In such a way, the cell and the next address are stored in a pair, whereby when one cell which is to be outputted to a certain line has been read out from the common buffer memory 203, it is possible to become aware of the cell address to be read out next time on the basis of that line, and also by holding that cell address until the next reading operation is carried out, it is possible to read out the cells in turn from the leading cell for every queue.

On the other hand, the next write address which has been obtained from the empty address FIFO 807 is stored as the write address of the next cell of the queue of interest in the address register circuit 808. When the next cell which is to be outputted to the same output line has been inputted, the operation of writing the cell is carried out using the above-mentioned next write address which has been read out from the address register circuit 808, whereby it is possible to write the next cell to the memory position to which the address (pointer address), which has been stored in a pair with the last cell in the above-mentioned common buffer memory 203, points. As a result, it is possible to construct the queue which is list-structured in correspondence to the lines.

Incidentally, in the case where the cell is written to the common buffer memory, the value of the queue length counter 804 is incremented by one. In addition, in the case where the empty address FIFO 807 becomes empty, the signal representing the absence of the empty area (the fullness of the buffer) is outputted to a signal line 851. Since in this case, the discard detection signal is outputted from the AND circuit 803 and the write permission signal is not outputted from the NOR circuit 802, writing the new input cell to the buffer is suppressed. In addition, the value of the queue length counter 804 is held as it is.

During the operation of reading out the cell from the common buffer 203, the signal relating to the line number, for specifying the output line queue, by which the cell reading is to be carried out is outputted from a read control table 805 synchronously with the timing signal generated from an output timing counter 806, and that signal relating to the line number is inputted to both the queue length counter 804 and the address register circuit 808. In the queue length counter 804, the register in which the queue length of the above-mentioned line number is stored is selected, and in the case where the queue length is equal to or larger than "1", the count value is decremented by one and also the read permission signal is outputted. On the other hand, in the case where the queue length is "0", the count value is not decremented, and also the read permission signal is not outputted.

When the read permission signal has been outputted, the read address is outputted from the address register circuit 806 and on the basis of that address, the cell and the address are read out in a pair from the common buffer 203. The above-mentioned address is inputted to the address register circuit 808 and then is stored therein as the next cell reading address of the output line of interest. In addition, the read address which was used to access to the common buffer and is now useless, is released as the empty address and then is stored in the empty address FIFO 807.

According to the present embodiment, since the discarding of the cell is carried out in units of a message of the superior protocol, the load to the network is reduced during the overcrowding, and it is possible to prevent the discarded cell from spreading over other messages. In addition, since the reception terminal of the connection in which the discarding of the cell occurs can be speedily informed of the fact that the message which is being received can not be normally completed with the reception thereof, the resource can be prevented from being uselessly used in the reception terminal.

Next, description will hereinbelow be given with respect to a second embodiment (an embodiment 2).

Figure 10:
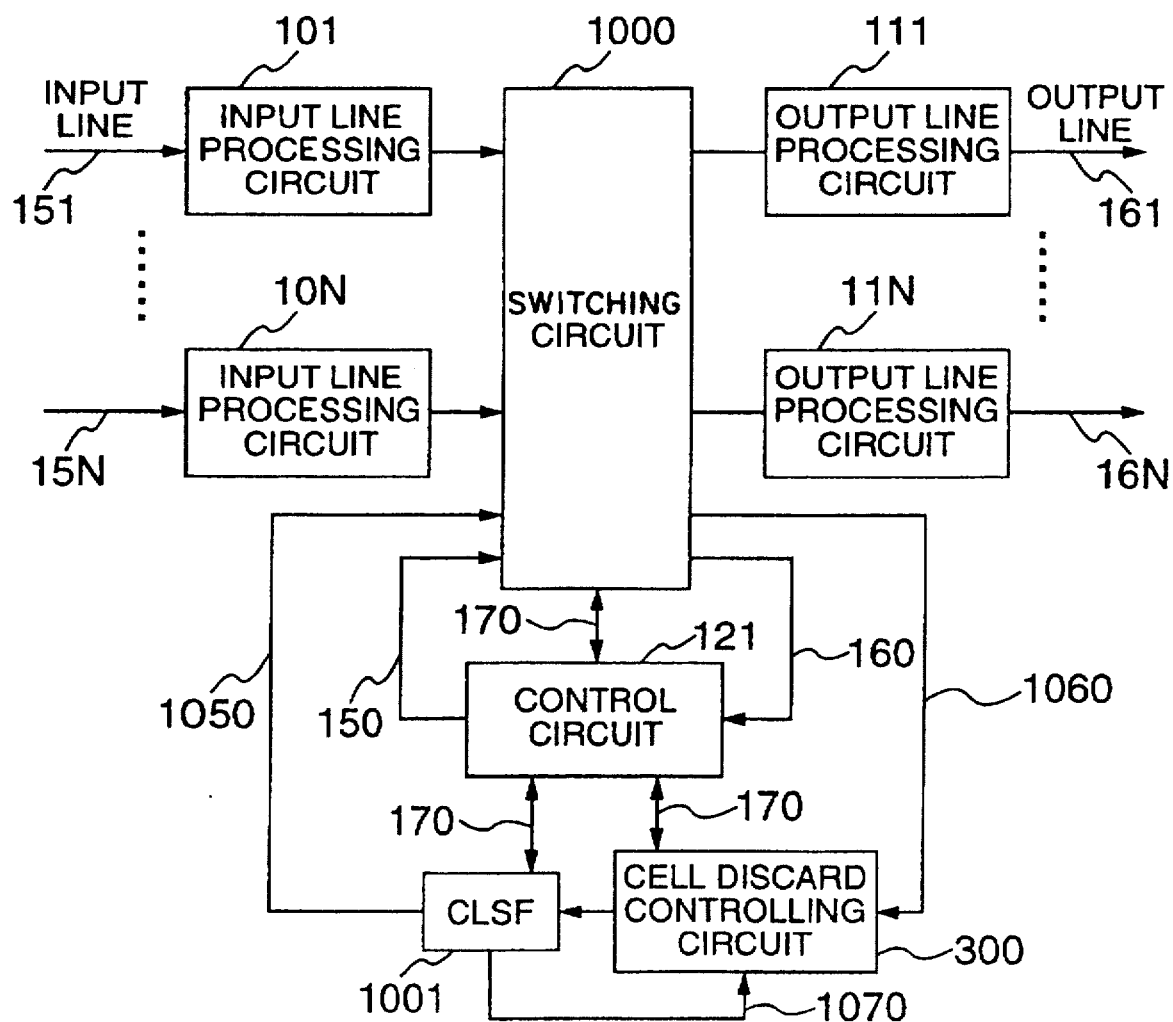
FIG. 10 is a block diagram showing a configuration of another embodiment of the ATM switch to which the present invention is applied.

FIG. 10 shows a system configuration in the case where a cell discard controlling circuit 300 is additionally provided as an externally mounted circuit in a conventional switch having a conventional configuration which does not include a facility of controlling the discarding of the cell inside of the switching circuit 1000.

In the example of FIG. 10, there is shown the structural example in the case where when a connectionless service function module 1001 is additionally provided in the switch, the above-mentioned cell discard controlling circuit 300 is provided therein at the same time. By "the connectionless service function" described herein is meant a function which is shown in JP-A-4-179336 entitled "Method of Exchanging and Processing Connectionless Message in ATM System". In this connection, each cell on the connection utilizing this connectionless service function is distributed to an output line 1060 by the switching circuit 1000.

In general, "AAL Type ¾" is used on the connection utilizing the connectionless service function. The cell which is communicated in the connection emptying this type is given a series of sequence numbers. A connectionless service function (CLSF) module 1001 for managing those cells can detect the discard of the cell due to the buffer overflow of the switch and also monitor the continuity of the sequence numbers for every connection, thereby detecting the omission of the cell generated due to other causes in the network.

When a cell omission has been generated due to any one of the above-mentioned causes, the CLSF module 1001 outputs a cell discard detection signal and then informs the cell discard controlling circuit 300 through a signal line 1070. Then, the cell discard controlling circuit 300 executes the processing of discarding the cell in the same manner as that in the embodiment 1 with respect to the subsequent cells to be inputted to the CLSF module 1001.

According to the present embodiment, the cell discard controlling facility can be additionally provided in the form of the externally mounted circuit in the existing switch, and also the service for discarding selectively the useless cell can be carried out in the connection of the specific range. In addition, according to the system configuration shown in FIG. 10, since the excessive cell is prevented from being inputted to other additional modules such as the connectionless service function, the load in those additional facilities can be reduced and hence the processing capacity can be increased.

Next, description will hereinbelow be given with respect to a third embodiment (an embodiment 3).

Figure 11:
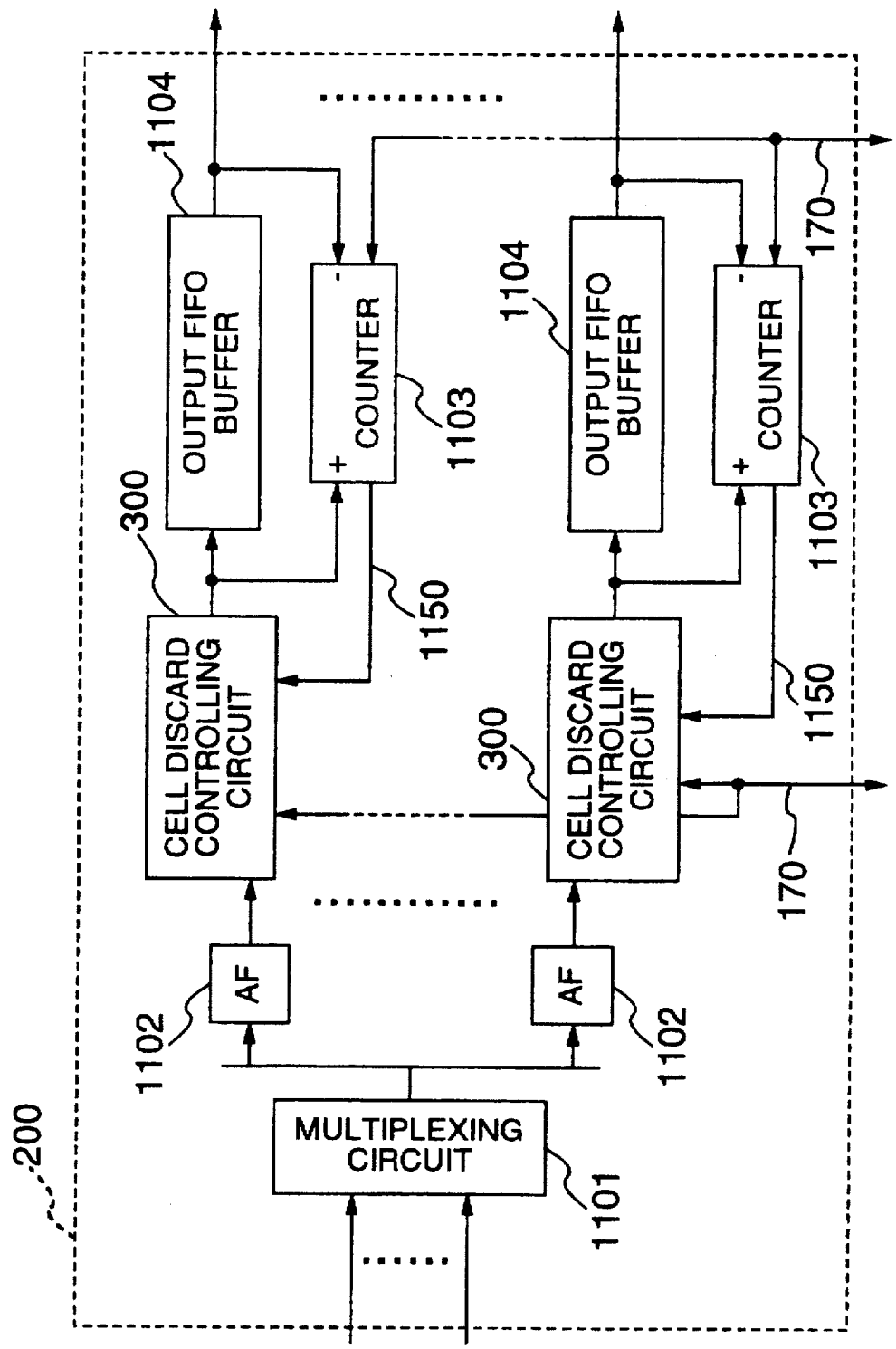
FIG. 11 is a block diagram showing a configuration of a switching circuit unit of an output buffer system to which the present invention is applied.

FIG. 11 shows a configuration in the case where the present invention is applied to an ATM switch having a switching circuit of an output buffer system. The principles of the switching circuit of the output buffer system is described in an article entitled "Output Buffer Switch Architecture for Asynchronous Transfer Mode", ICC'89, Proceeding pp.99 to 103, for example.

The switching circuit 200 includes a multiplexing circuit 1101, a plurality of address filters 1102 which are provided in correspondence to the output lines, a plurality of cell discard controlling circuits 300 which are connected to the respective address filters, a plurality of output FIFO buffers 1104 which are connected to the respective cell discard controlling circuits 300 and a plurality of counters 1103 which are connected to the respective cell discard controlling circuits 300. In the switching circuit 200, after the cells which have been inputted in parallel from the respective input lines are converted into the series cell train through the multiplexing circuit 1101, the cells are inputted to the respective cell discard controlling circuit 300 in correspondence to the output lines by the respective address filters 1102, and then the judgement of passage/discard is carried out. The cells which have been passed through the respective cell discard controlling circuits 300 are stored in the respective output FIFO buffers 1104 and then are outputted to the respective output lines through the respective output line processing circuits 11 (111 to 11N) shown in FIG. 1.

The value of the counter 1103 is incremented by one every time the cell is stored in the output FIFO buffer 1104. In the case where the value of the counter reaches the capacity of the buffer 1104, or exceeds a predetermined threshold, the cell discard detection signal is outputted to a signal line 1150 and then the cell discard controlling circuit 300 is informed of the occurrence of the discarded cell. In this state, the new input cell is not stored in the buffer 1104, but is discarded. Since the operation of each cell discard controlling circuit 300 is the same as those of the above-mentioned embodiments 1 and 2, the description thereof is omitted here for the sake of simplicity.

On the other hand, in the case where the value of the counter does not exceed the capacity of the buffer, or does not exceed the predetermined threshold, the input cell is stored in the buffer, and the value of the counter is decremented by one every time the cell is read out. Incidentally, in the case where the value of the counter is zero in the reading operation, since the buffer is empty, the cell is not read out.

As set forth hereinabove, according to the present invention, the cell which is relayed by the switch is subjected to the processing of selectively discarding the cell based on the superior protocol message structure, and also the cell which has become useless for the reception terminal is positively eliminated from the network. Therefore, there is provided an advantage in which the network resource can be effectively utilized and also the discarding of the cell due to the overcrowding can be previously prevented from spreading over other messages. In addition, if when the discarding of the cell occurs, the reception terminal of the cell of interest is informed of the occurrence of the discarding of the cell from the exchange, the reception terminal side does not continue to uselessly reserve the resource, and hence it is possible to rapidly proceed to the management which should be carried out in the case where the message can not be normally received. This is another advantage.

What is claimed is:

1. An ATM switch which is designed in such a way that an input cell which has been received through an input line is temporarily stored, and then is outputted to one of output lines which is determined on the basis of header information of said input cell, said ATM switch comprising:

cell discard controlling means for subjecting, when discarding of a first cell occurs, a second cell constituting the same superior protocol message as that of the discarded first cell out of subsequent cells each having the same logical connection as that of the discarded cell to a cell discarding process, wherein said cell discard controlling means sends a cell for informing a reception terminal of the discarding of the subsequent cells.

2. An ATM switch according to claim 1, wherein said cell discard controlling means determines whether a cell is to be discarded or not for each of all cells constituting the same superior protocol message as that of the discard cell out of the subsequent cells on the basis of either a parameter value which is previously specified by a maintenance command or a parameter value which is reported by a terminal when setting a call.

3. An ATM switch comprising:

a plurality of input lines, a plurality of output lines, a buffer memory and buffer control means for storing temporarily an input cell received through one of said input lines while forming queues in correspondence to said output lines and for outputting the input cell to any one of said output lines determined on the basis of header information;

means for storing at least a processing mode and a type of a superior protocol message in correspondence to connection identifying information included in each of the input cells;

means for detecting an omission of a cell occurring in said switch;

means for detecting a cell as a demarkation of a message, in which the omission of the cell occurs, out of the subsequent input cells;

means for carrying out the discarding of the cell corresponding to both the processing mode and the type of the superior protocol message stored in said storage means, within the range of one message in which the ending cell is the last cell, out of the subsequent cells each having the same connection identifier as that of the cell discarded by the cell omission; and means for producing and sending a cell for informing a reception side terminal that the discarding of the cell has been carried out.

4. An ATM switch which is designed in such a way that an input cell which has been received through an input line is temporarily stored, and then is outputted to one of output lines which is determined on the basis of header information of said input cell, said ATM switch comprising:

a cell discard controlling circuit for determining whether a cell is to be discarded or not for each input cell; and a transmission circuit, responsive to discarding of a first cell by said discard controlling circuit, for sending a second cell to a reception terminal of said first cell to inform the reception terminal of the first cell discard.

5. An ATM switch according to claim 4, wherein said cell discard controlling circuit discards subsequent cells that constitute the same superior protocol message as that of the discarded first cell.

6. An ATM switch according got claim 4, further comprising:

means for causing a transmission terminal to inform said cell discard controlling circuit of whether the subsequent cells that constitute the same superior protocol message as that of the discarded first cell are to be discarded or not.

* * * * *